United States Patent
Kang et al.

(10) Patent No.: US 9,124,440 B2
(45) Date of Patent: Sep. 1, 2015

(54) METHOD AND APPARATUS FOR SHARING CONTENT IN HOME NETWORK ENVIRONMENT

(75) Inventors: Young-Ae Kang, Seoul (KR); Jong-Man Park, Gyeonggi-do (KR); Min-Seo Park, Gyeonggi-do (KR); Min-June Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 279 days.

(21) Appl. No.: 13/594,318

(22) Filed: Aug. 24, 2012

(65) Prior Publication Data

US 2013/0054795 A1  Feb. 28, 2013

(30) Foreign Application Priority Data

Aug. 25, 2011 (KR) .................. 10-2011-0085056

(51) Int. Cl.
| | |
|---|---|
| H04L 12/28 | (2006.01) |
| H04N 21/00 | (2011.01) |
| H04N 21/2225 | (2011.01) |
| H04N 21/20 | (2011.01) |
| H04L 29/06 | (2006.01) |
| H04L 29/08 | (2006.01) |
| H04W 8/00 | (2009.01) |
| H04W 48/20 | (2009.01) |

(52) U.S. Cl.
CPC .......... *H04L 12/2809* (2013.01); *H04L 12/281* (2013.01); *H04L 12/287* (2013.01); *H04L 12/2856* (2013.01); *H04L 65/1026* (2013.01); *H04L 65/4084* (2013.01); *H04L 65/60* (2013.01); *H04L 67/1002* (2013.01); *H04L 67/303* (2013.01); *H04N 21/00* (2013.01); *H04N 21/20* (2013.01); *H04N 21/2225* (2013.01); *H04W 8/005* (2013.01); *H04W 48/20* (2013.01)

(58) Field of Classification Search
CPC ... H04N 21/00; H04N 21/20; H04N 21/2225; H04L 12/287; H04L 12/2856; H04L 65/60; H04L 67/1002
USPC .............. 709/203, 231, 219, 217; 725/87; 370/401

See application file for complete search history.

(56) References Cited

U.S. PATENT DOCUMENTS

| | | | |
|---|---|---|---|
| 2006/0161635 A1* | 7/2006 | Lamkin et al. | 709/217 |
| 2007/0217436 A1* | 9/2007 | Markley et al. | 370/401 |
| 2009/0287794 A1* | 11/2009 | Saaranen et al. | 709/219 |
| 2011/0087759 A1 | 4/2011 | You | |
| 2011/0107379 A1* | 5/2011 | Lajoie et al. | 725/87 |
| 2012/0117193 A1* | 5/2012 | Phillips et al. | 709/219 |
| 2012/0151006 A1* | 6/2012 | McInerney et al. | 709/219 |
| 2012/0158984 A1* | 6/2012 | Maitre et al. | 709/231 |
| 2013/0282801 A1* | 10/2013 | Barrett et al. | 709/203 |

FOREIGN PATENT DOCUMENTS

| | | |
|---|---|---|
| EP | 1 845 683 | 10/2007 |
| EP | 2 202 939 | 6/2010 |
| JP | 2009258916 | 11/2009 |

* cited by examiner

*Primary Examiner* — Le H Luu
(74) *Attorney, Agent, or Firm* — The Farrell Law Firm, P.C.

(57) ABSTRACT

A method and an apparatus for sharing content in a home network environment are provided. The method for sharing the content in the home network environment includes detecting a connection to a network; searching for at least one device connected to the network; and when the at least one is connected to the network, checking a type of the at least one device connected to the network, and determining whether to operate as a content providing server according to the type of the at least one device.

20 Claims, 7 Drawing Sheets

METHOD AND APPARATUS FOR SHARING CONTENT IN HOME NETWORK ENVIRONMENT

PRIORITY

The present application claims priority under 35 U.S.C. §119(a) to Korean Patent Application Serial No. 10-2011-0085056, which was filed in the Korean Intellectual Property Office on Aug. 25, 2011, the entire disclosure of which is hereby incorporated herein by reference.

BACKGROUND OF THE INVENTION

1. Field of the Invention

The present invention relates generally to a method and an apparatus for sharing content in a home network environment.

2. Description of the Related Art

A Digital Living Network Alliance (DLNA) network enables sharing of various content such as music, photos, and movies by digital devices interconnected over a wireless Local Area Network (LAN).

The DLNA network communicates based on Universal Plug and Play (UPnP) protocol, and includes a Digital Media Server (DMS) for providing content to other device, a Digital Media Player (DMP) and a Digital Media Renderer (DMR) for receiving and playing the content from the DMS, and a Digital Media Controller (DMC) for controlling the DMR.

A mobile terminal supporting the DLNA network detects all of DLNA devices accessing its network by connecting to the wireless LAN according to a DLNA service request of a user, searches for content of the DLNA devices, and displays information of the corresponding content in a screen so that the user can select and play the intended content. Accordingly, the mobile terminal supporting the DLNA network can function as the DMS to provide the content to other DLNA device, function as the DMP to receive and play the content from the other DLNA devices, and function as the DMC to control the DMR.

As such, the conventional mobile terminal supporting the DLNA network searches for the neighboring DLNA device and searches for the content only when the user requests the DLNA service. When the DLNA service is not executed, the conventional mobile terminal cannot detect the DLNA device connected to the corresponding network and thus, cannot recognize shareable content.

In addition, each time the user requests the DLNA service, the mobile terminal detects the DLNA devices accessing the corresponding network and receives content information and thumbnail from the detected devices. As a result, the time is delayed and the network traffic increases until the DLNA service is executed.

SUMMARY OF THE INVENTION

The present invention is designed to address at least the problems and/or disadvantages described above and to provide at least the advantages described below.

Accordingly, an aspect of the present invention is to provide a method and an apparatus of a mobile terminal for automatically detecting and managing a DLNA device in a DLNA network.

Another aspect of the present invention is to provide a method and an apparatus of a mobile terminal for automatically detecting and sharing content, without user control, by detecting network access in a DLNA network.

Another aspect of the present invention is to provide a method and an apparatus of a mobile terminal for aborting DLNA related operation, while not accessing a network in a DLNA network.

Another aspect of the present invention is to provide a method and an apparatus of a mobile terminal for automatically detecting change of a DLNA device, while accessing a network in a DLNA network.

Another aspect of the present invention is to provide a method and an apparatus of a mobile terminal for managing content corresponding to a DLNA device, while accessing a network in a DLNA network.

In accordance with an aspect of the present invention, a method of a mobile terminal for sharing content in a home network environment includes detecting a connection to a network; searching for at least one device connected to the network; and when the at least one is connected to the network, checking a type of the at least one device connected to the network, and determining whether to operate as a content providing server according to the type of the at least one device.

In accordance with another aspect of the present invention, an apparatus of a mobile terminal for sharing content in a home network environment includes a control unit for detecting a connection to a network, searching for at least one device connected to the network, and when the at least one is connected to the network, checking a type of the at least one device connected to the network, and determining whether to operate as a content providing server according to the type of the at least one device.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In accordance with an embodiment of the present invention, a method and an apparatus of a mobile terminal are provided for automatically detecting and managing a DLNA device in a DLNA network.

Figure 1:
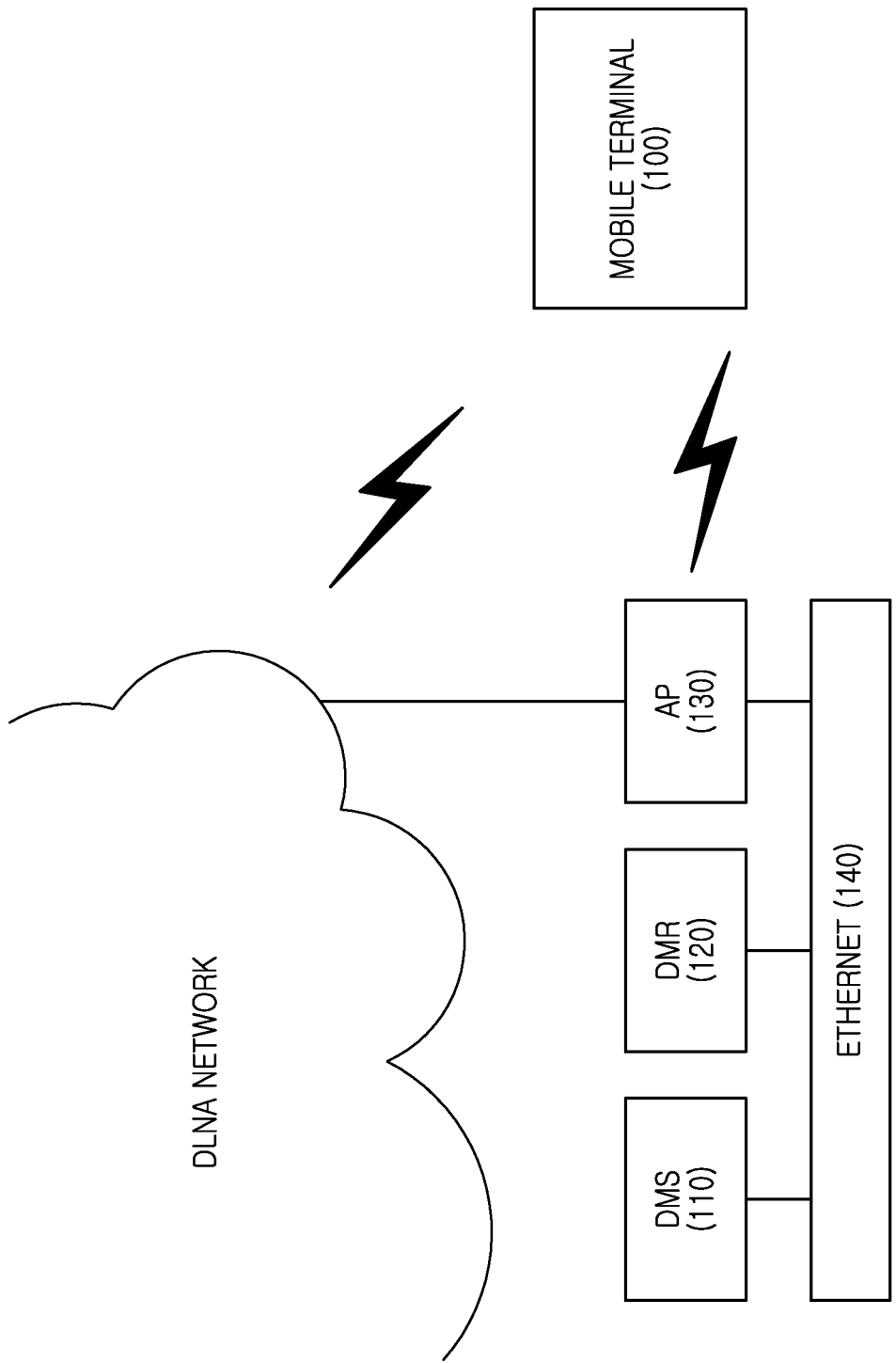
FIG. 1 illustrates a DLNA network system according to an embodiment of the present invention.

FIG. 1 illustrates a DLNA network system according to an embodiment of the present invention.

Referring to FIG. 1, the DLNA network system conforms to a Universal Plug and Play (UPnP) protocol and includes devices (hereinafter, referred to as DLNA devices) that access the DLNA network and perform wired or wireless communication in a format based on the UPnP protocol.

Specifically, the DLNA network system includes a Digital Media Server (DMS) 110 for wired access to an Access Point (AP) 130 and providing content (or media), a Digital Media Renderer (DMR) 120 for wired access to the AP 130 and receiving and playing the content, and a mobile terminal 100 for wired or wirelessly access to the AP 130, and providing or receiving and playing the content.

The mobile terminal 100 detects whether it is connected to a wireless Local Area Network (LAN). When accessing the wireless LAN, the mobile terminal 100 automatically searches for DLNA devices, and stores and manages device information and content information. When not accessing the wireless LAN, the mobile terminal 100 aborts the DLNA related operation.

More specifically, when accessing the AP 130, the mobile terminal 100 periodically detects whether a DLNA device accesses the AP 130. When detecting the DLNA device accessing the AP 130, the mobile terminal 100 shares the content with the corresponding device based on a type of the DLNA device. Upon detecting the DMS 110 according to the DLNA device detection result, the mobile terminal 100 stores information of the DMS 110 and sets the status of the DMS 110 to an accessible active state. However, when the DMS 110 is not detected, but the DMR 120 is detected according to the DLNA device detection result, the mobile terminal 100 stores information of the DMR 120, sets the status of the DMR 120 to an accessible active state, determines to operate the DMS 110, and provides the content to the DMR 120.

Additionally, the mobile terminal 100 detects disconnection of the DLNA device accessing the AP 130 and deactivates the corresponding DLNA device. For example, the mobile terminal 100, when accessing the AP 130, continuously detects the access status of other DLNA devices connected to the AP 130. When a DLNA device disconnects from the AP 130, e.g., because of power-off, movement, or user control, the mobile terminal 100 recognizes the disconnection of the corresponding DLNA device and blocks the access of the corresponding DLNA device by deactivating the corresponding DLNA device.

Further, when it is detected that no DLNA device is accessing the AP 130, the mobile terminal 100 maintains or deletes the corresponding information by verifying DLNA related information stored therein.

Figure 2:
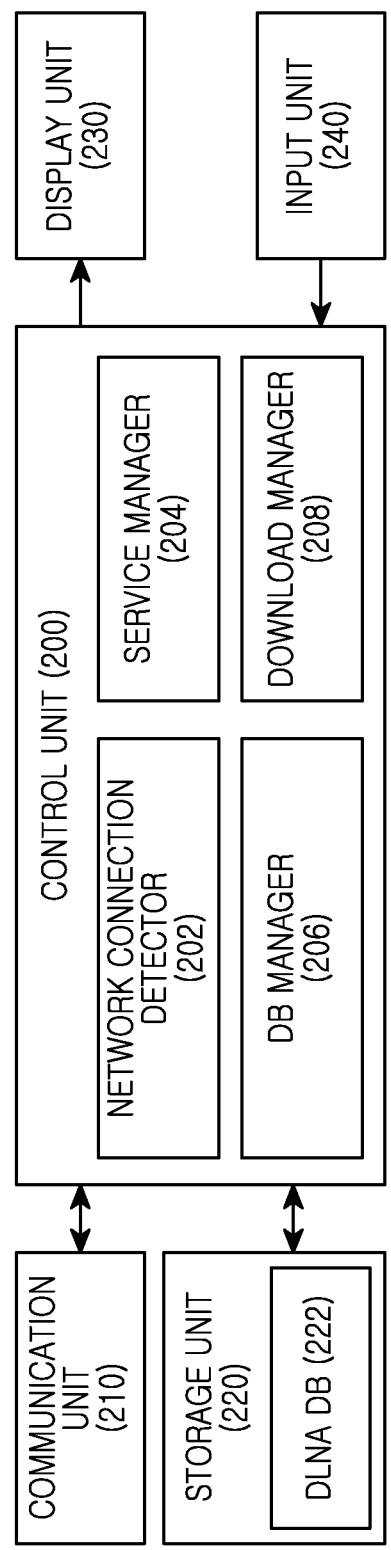
FIG. 2 illustrates a mobile terminal in a DLNA network according to an embodiment of the present invention.

FIG. 2 is a block diagram illustrating a mobile terminal in a DLNA network according to an embodiment of the present invention.

Referring to FIG. 2, the mobile terminal includes a control unit 200, a communication unit 210, a storage unit 220, a display unit 230, and an input unit 240. In particular, the control unit 200 includes a network connection detector 202, a service manager 204, a DataBase (DB) manager 206, and a download manager 208. Further, the storage unit 220 includes a DLNA DB 222.

The control unit 200 controls and processes the operations of the mobile terminal and supports a DLNA service. Herein, the DLNA service indicates a service enabling sharing and playing of content among the DLNA devices connected (wired or wirelessly) using the DLNA network.

The network connection detector 202 periodically detects the wireless LAN access state of the mobile terminal and provides the detection result to the service manager 204.

When the mobile terminal is connected to the wireless LAN, the service manager 204 activates the DLNA service to automatically search for the DLNA devices accessing the wireless LAN, and controls the mobile terminal to store and manage information and content information of the corresponding device. When the mobile terminal is not connected to the wireless LAN, the service manager 204 aborts the DLNA related operation by deactivating the DLNA service until the access to the wireless LAN.

More specifically, when the mobile terminal accesses a particular AP, the service manager 204 searches for the DLNA device accessing the AP. Accordingly, when detecting no DLNA device accessing the AP, the service manager 204 requests the DB manager 206 to verify the data. However, when detecting a DLNA device accessing the AP, the service manager 204 stores information of the particular AP in the storage unit 220 through the DB manager 206 and then determines whether the DLNA devices accessing the AP include the DMS. When detecting the DMS, the service manager 204 controls the DB manager 206 to store the DMS information in the DLNA DB 222 and to set the DMS state to the accessible active state. However, when detecting no DMS, but detecting the DMR, the service manager 204 controls the DB manager 206 to store DMR information to the DLNA DB 222, to set the DMR state to the accessible active state, and to control the mobile terminal to function as the DMS.

Additionally, the service manager 204 detects a disconnection of the DLNA device accessing the particular AP, and blocks the access of the corresponding DLNA device by deactivating the disconnected DLNA device.

When the user requests a DLNA service, the service manager 204 searches for the AP capable of providing the DLNA service in the storage unit 220, and controls the mobile terminal to access the AP. Herein, the AP capable of providing the DLNA service indicates the AP accessed by the DLNA device. For example, the service manager 204 may automatically access the AP most recently connected among the APs capable of providing the DLNA service, or request the user to select the AP by displaying a list of the APs capable of providing the DLNA service and then access the AP selected by the user.

Under the control of the service manager 204, the DB manager 206 controls the mobile terminal to receive the searched DLNA device and the content of the DLNA device from the communication unit 210 and to store them in the DLNA DB 222. The DB manager 206 maps and stores the DLNA device information and the content information with the particular AP accessed by the mobile terminal.

When the service manager 204 requests data verification, the DB manager 206 verifies the DLNA related information stored to the DLNA DB 222, and maintains or deletes the corresponding information. That is, with respect to the DLNA device related information stored to the DLNA DB 222, the DB manager 206 controls the mobile terminal to set the state of or delete the corresponding DLNA device related information using a data size, an access count (or an access frequency), and a last access time. Herein the data size may indicate the size of the thumbnail data relating to the corresponding DLNA device, or the total data size of all of information relating to the corresponding DLNA device; that is, the corresponding DLNA device information, the content information, and the thumbnail data.

When the data size of a particular DLNA device is greater than a threshold size, the access count of the particular DLNA device is smaller than a threshold count, and a Time To Live (TTL) from the last access time to the current time in the particular DLNA device is greater than a threshold TTL, the DB manager 206 deletes all of the information relating to the particular DLNA device. However, when only one or two of the data size, access count, and TTL conditions are satisfied, the DB manager 206 sets the state information of the corresponding DLNA device to the inactive state. When neither of the conditions is satisfied, the DB manager 206 sets the state information of the corresponding DLNA device to the active state.

Under the control of the service manager 204, the download manager 208 controls the mobile terminal to download the thumbnail of the content from the DMS connected to the AP of the mobile terminal, and to store the thumbnail to the storage unit 220. The thumbnail is mapped and stored with the content information of the DMS.

The communication unit 210 communicates under the control of the control unit 200. In particular, the communication unit 210 transmits and receives signals to and from the DLNA devices by accessing the AP 130.

The storage unit 220 stores programs and data for the operations of the mobile terminal. More specifically, the DLNA DB 222 stores the DLNA device information accessing the corresponding AP and the content of the DLNA device per AP. The DLNA DB 222 stores the state information of the DLNA devices.

Herein, the DLNA state information can include the active state indicating the accessibility to the corresponding DLNA device and the inactive state indicating no access. The DLNA device information indicates metadata such as type of the corresponding DLNA device, Unique Device Name (UDN), and descriptions of the corresponding DLNA device. The content information indicates metadata such as content ID and content storage location.

The storage unit 220 stores the thumbnails of content stored in the DLNA DB 222.

The display unit 230 displays various state information, numbers, characters, and images generated during the operations of the mobile terminal. For example, the display unit 230 can display the list of the AP capable of providing the DLNA service under the control of the service manager 204.

The input unit 240 includes, for example, keys and/or a touch sensor, which provide the control unit 200 with key inputs or coordinates corresponding to user input. For example, the input unit 240 receives input selecting the AP to access according to the user's key press or touch and provides the selection to the control unit 200.

Figure 3A:
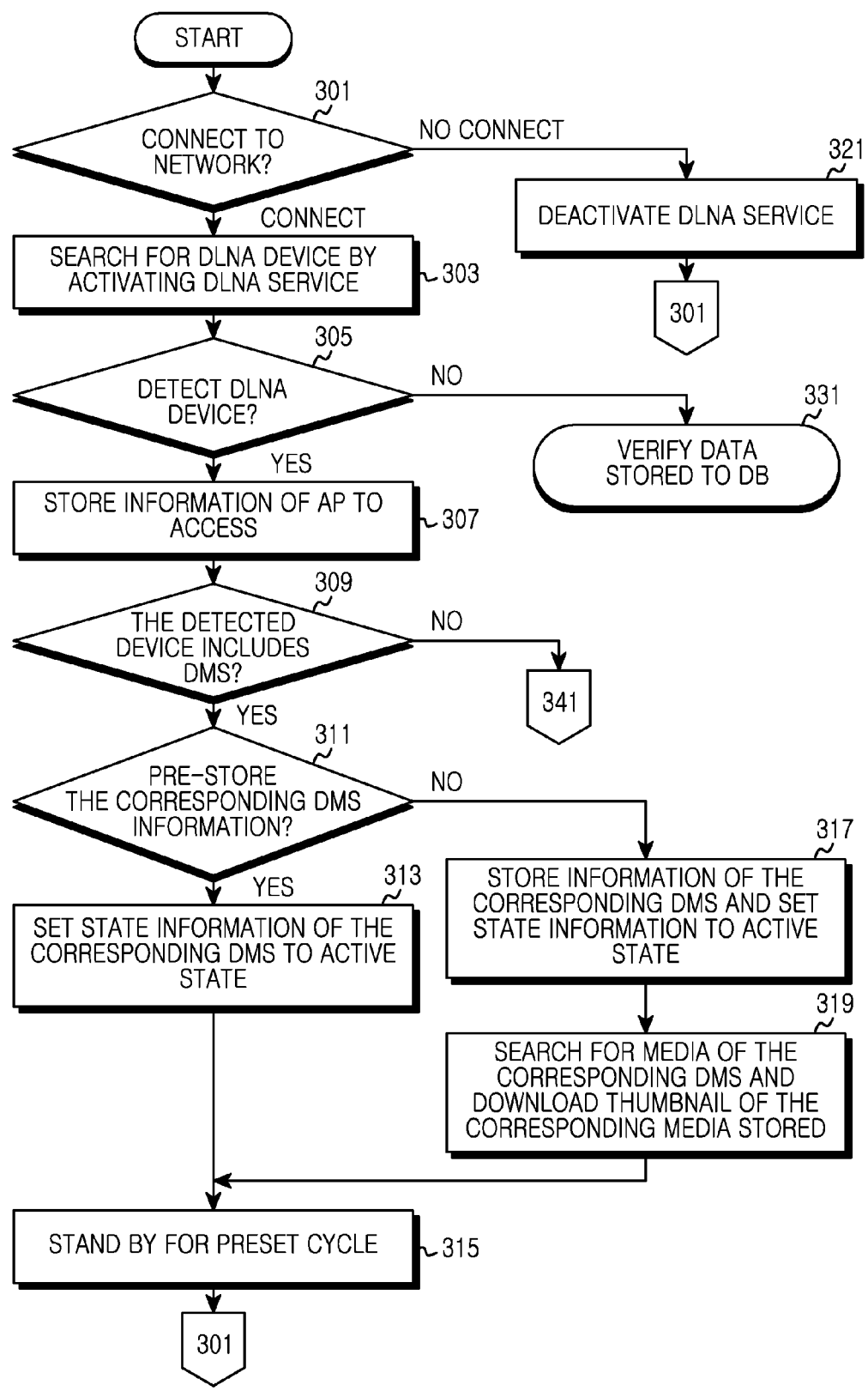
FIGS. 3A and 3B are flowcharts illustrating a mobile terminal method for detecting a DLNA device and managing content in a DLNA network according to an embodiment of the present invention.
Figure 3B:
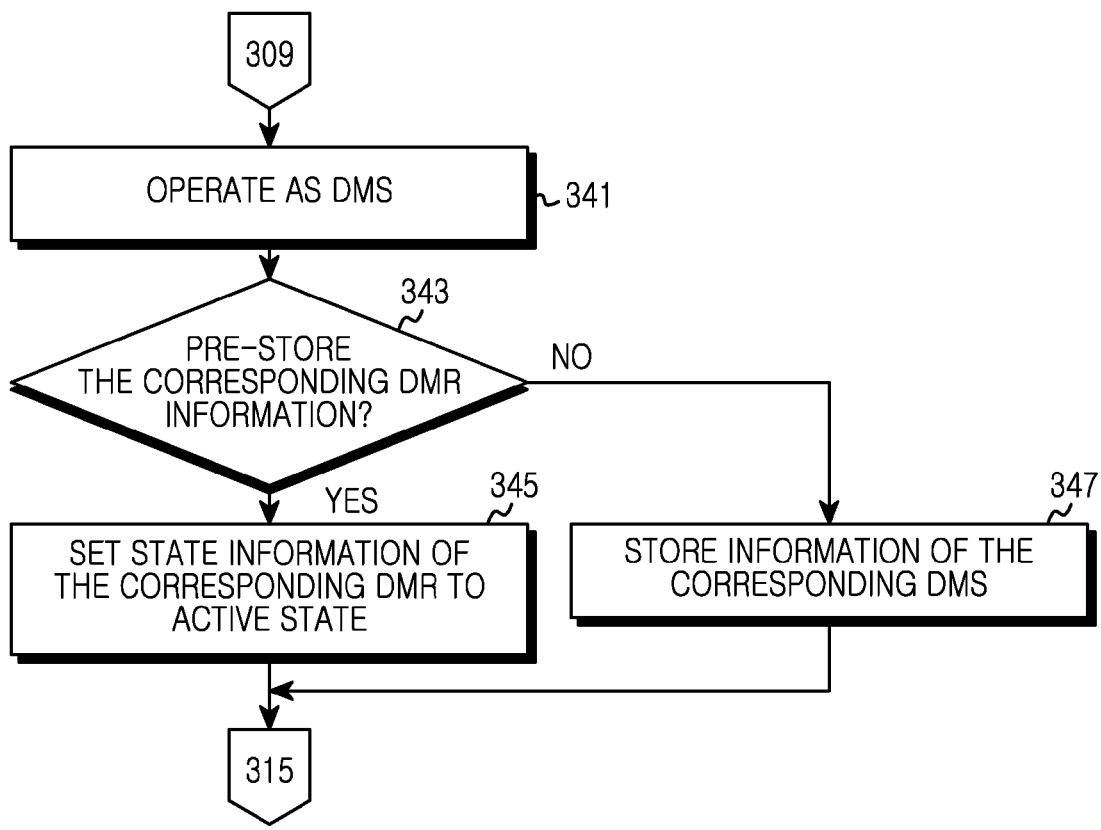

FIGS. 3A and 3B are flowcharts illustrating a mobile terminal method for detecting a DLNA device and managing content in a DLNA network according to an embodiment of the present invention.

Referring to FIG. 3A, the mobile terminal examines the network connection state for the DLNA service in step 301. For example, the mobile terminal checks whether it is connected to the wireless LAN. When not connected to the network for the DLNA service, the mobile terminal deactivates the DLNA service in step 321. That is, the mobile terminal aborts the DLNA related operation until it accesses the network for the DLNA service.

However, when the mobile terminal is connected to the network for the DLNA service in step 301, the mobile terminal searches for the DLNA devices connected to the network by activating the DLNA service in step 303 and determines whether the DLNA device is detected in step 305. For example, the mobile terminal determines whether at least one DLNA device accesses its AP through a wired or wireless connection. When detecting no DLNA device connected to the network, the mobile terminal verifies the data stored to its DB in step 331. Herein, the data stored to the DB is verified in order to delete the DLNA device information occupying the storage space, but having no recent access record, i.e., the DMS information. The data verification will be explained in more detail below with reference to FIG. 4.

When detecting at least one DLNA device connected to the network in step 305, the mobile terminal stores the information of the AP currently accessing in step 307 and determines whether the at least one device detected includes a DMS in step 309. Herein, depending on the presence or absence of the DMS, the mobile terminal can determine whether to function as a DMS, a DMP, or a DMC.

When detecting the DMS in step 309, the mobile terminal determines to function as the DMP or the DMC, and checks whether its DB pre-stores the DMS information for the currently accessing AP in step 311. Herein, the DMS information includes the UDN of the DMS, information indicating that the corresponding device functions as the DMS, and the descriptions of the corresponding DMS. When pre-storing the DMS information, the mobile terminal sets the state information of the DMS to the active state in step 313 and stands by for a preset cycle in step 315.

When the DMS information is not pre-stored in step 311, the mobile terminal maps and stores the DMS information with the current AP information, and sets the state information of the DMS to the active state in step 317.

In step 319, the mobile terminal searches for the content of the DMS, stores the content information, and downloads the thumbnail of the corresponding content. Thereafter, the mobile terminal stands by for a preset cycle in step 315.

When no DMS is detected in step 309, i.e., when detecting only the device serving as the DMR, the mobile terminal determines to function as the DMS and commences the DMS operation in step 341, as illustrated in FIG. 3B.

In step 343, the mobile terminal checks whether its DB pre-stores the DMR information for the current AP. Herein, the DMR information includes the UDN of the DMR, information indicating that the corresponding device functions as the DMR, and the descriptions of the corresponding DMR.

When pre-storing the DMR device information 343, the mobile terminal sets the state information of the DMR to the active state in step 345, and the stands by for a preset cycle to step 315.

When the DMR information is not pre-stored in step 343, the mobile terminal maps and stores the DMR information with the current AP information, and sets the state information of the DMR to the active state in step 347. Thereafter, the mobile terminal stands by for a preset cycle in step 315.

After standing by for the preset cycle in step 315, the method returns to step 301.

Figure 4:
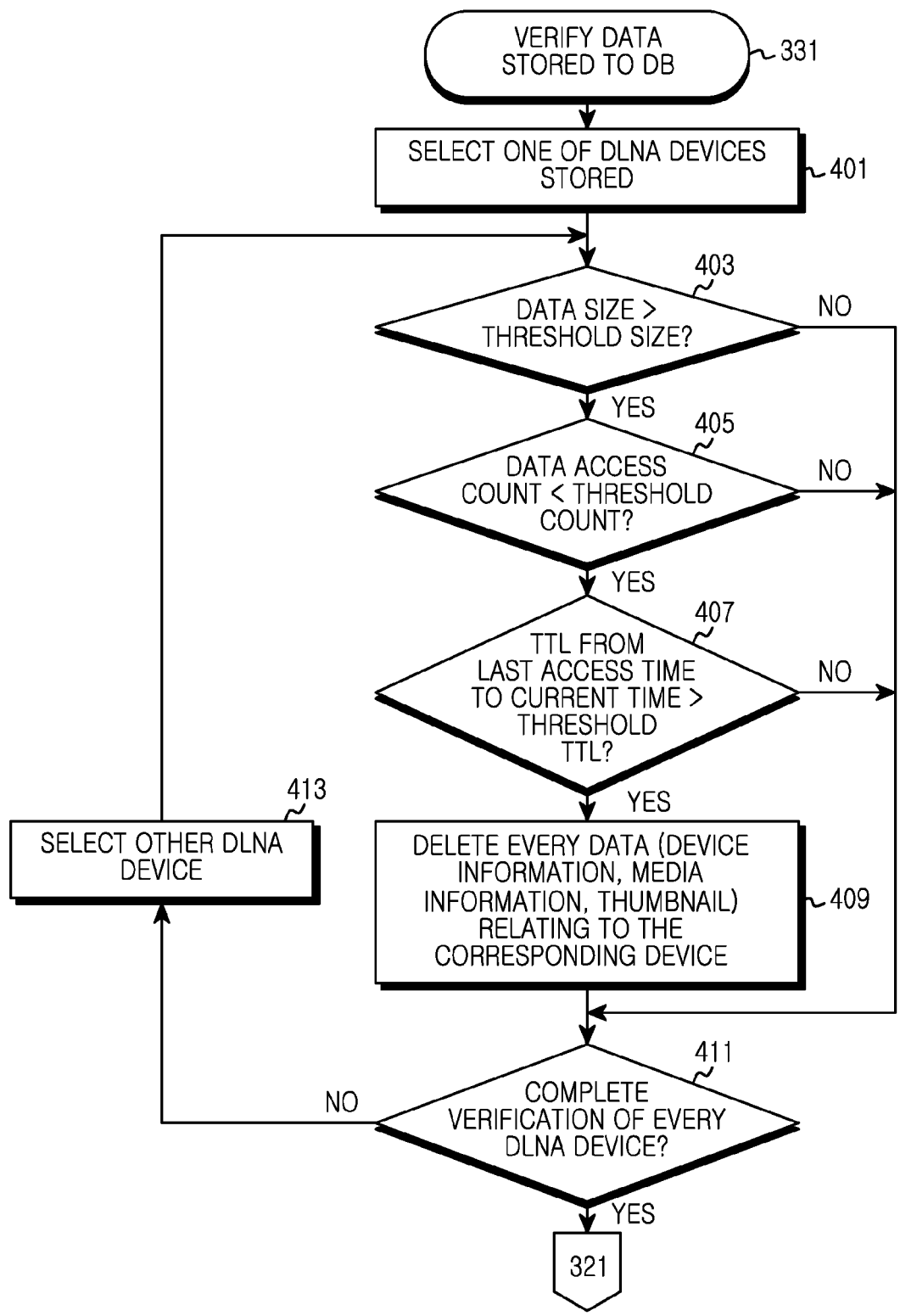
FIG. 4 is a flowchart illustrating a mobile terminal method for verifying data in a DLNA network according to an embodiment of the present invention.

FIG. 4 is a flowchart illustrating a mobile terminal method for verifying storing data in a DLNA network according to an embodiment of the present invention. Herein, the corresponding DLNA device is verified per DLNA device stored to the DB of the mobile terminal.

Referring to FIG. 4, in step 401, the mobile terminal selects a DLNA device to verify from among the DLNA devices stored in its DB.

In step 403, the mobile terminal determines whether the total data size of the selected DLNA device is greater than a threshold size. Herein, the total size of the data relating to the DLNA device may indicate the size of the thumbnails of the content of the DLNA device, or the total data size of all of the information relating to the DLNA device, i.e., the DLNA device information, the DLNA content information, and the thumbnail. When the total data size of the selected DLNA device is not greater than the threshold size, the mobile terminal determines whether the verification of every DLNA device stored in the DB is completed in step 411.

However, when the total data size of the selected DLNA device is greater than the threshold size in step 403, the mobile terminal determines whether the access count of the data of the DLNA device is smaller than the threshold count in step 405. When the access count is not smaller than the threshold count to the threshold count, the mobile terminal determines whether the verification of every DLNA device stored in the DB is completed in step 411.

However, when the access count is smaller than the threshold count in step 405, the mobile terminal determines whether the TTL from a last access time to a current time of the data of the DLNA device is greater than a threshold TTL in step 407. That is, the mobile terminal determines whether the access time of the data of the DLNA device is before the threshold time. Herein, the DLNA devices operate in a plug-and-play manner. Hence, each time DLNA devices are added or deleted in the network, the mobile terminal adds or deletes data to and from the DB. When the thumbnail is received, the performance of the mobile terminal is degraded. Thus, the TTL is used for the verification.

When the TTL of the data of the DLNA device is not greater than the threshold TTL, the mobile terminal determines whether the verification of every DLNA device stored in the DB is completed in step 411.

However, when the TTL of the data of the DLNA device is greater than the threshold TTL, the mobile terminal deletes the data relating to the corresponding DLNA device, for example, the device information, the content information, and the thumbnail, in step 409.

In step 411, the mobile terminal determines whether the verification of every DLNA device stored to the DB is completed. When every DLNA device is not verified, the mobile terminal selects another DLNA device stored in the DB in step 413 and then to the method repeats steps 403 to 411, until all of the DLNA devices are verified.

While the mobile terminal compares the access count of the data of the DLNA device with the threshold count in FIGS. 3A to 3B, alternatively, the mobile terminal may compare the access frequency indicating how frequently the mobile terminal accesses the data of the DLNA device over a certain time period, with a threshold frequency, instead of the access count.

When all of the data size, access count, and TTL conditions are satisfied, all data relating to a corresponding DLNA device is deleted. However, when one or two of the three conditions are satisfied, the state information of the corresponding DLNA device may be set to the inactive state and the access to the DLNA device may be blocked until all the three of the conditions are satisfied.

Figure 5:
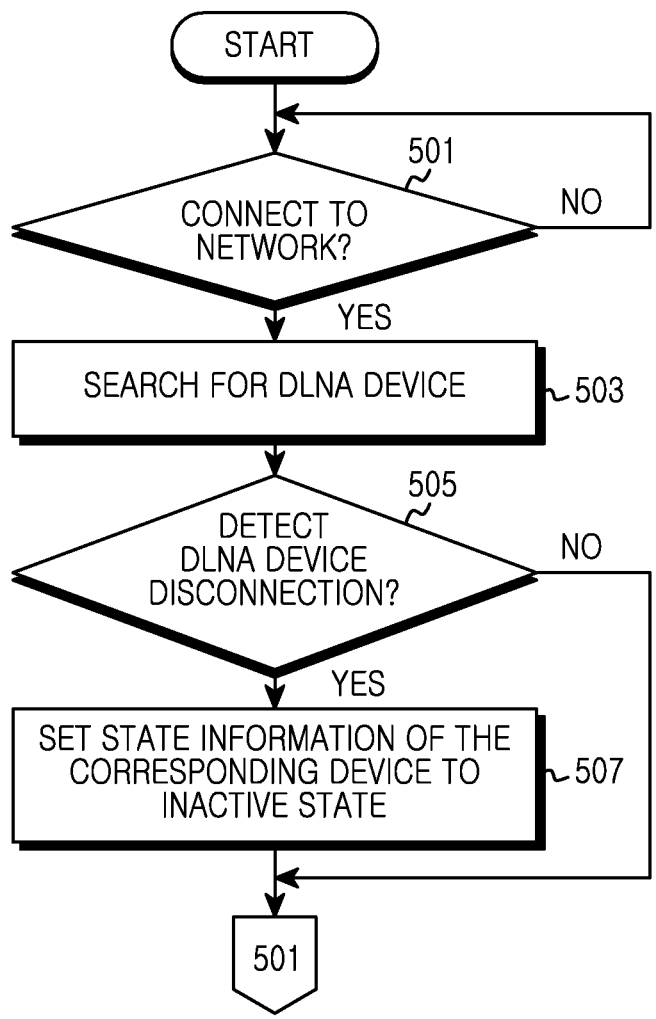
FIG. 5 is a flowchart illustrating a mobile terminal method for managing a DLNA device in a DLNA network according to an embodiment of the present invention.

FIG. 5 is a flowchart illustrating a method for managing a DLNA device in a DLNA network according to an embodiment of the present invention. Herein, the mobile terminal detects and manages the disconnected DLNA device.

Referring to FIG. 5, in step 501, the mobile terminal examines a network connection for the DLNA service. For example, the mobile terminal determines whether it is connected to the wireless LAN. When the mobile terminal is not connected to the network for the DLNA service, the method returns to step 501.

However, when the mobile terminal is connected to the network for the DLNA service, the mobile terminal searches for the DLNA devices connected to the network in step 503 and determines whether the disconnection of the DLNA device is detected in step 505. For example, the mobile terminal determines whether the DLNA device accessing its AP and detected in step 503 is disconnected from the corresponding AP because of the power-off, the movement, or the user control.

When detecting the disconnection of the DLNA device is detected in step 505, the mobile terminal sets the state information of the corresponding DLNA device to the inactive state in step 507. That is, the mobile terminal sets the state information of the DLNA device to the inactive state until the AP access of the DLNA device is detected again and thus indicates no access to the corresponding device.

However, when the disconnection of the DLNA device is not detected, the method returns to step 501.

Figure 6:
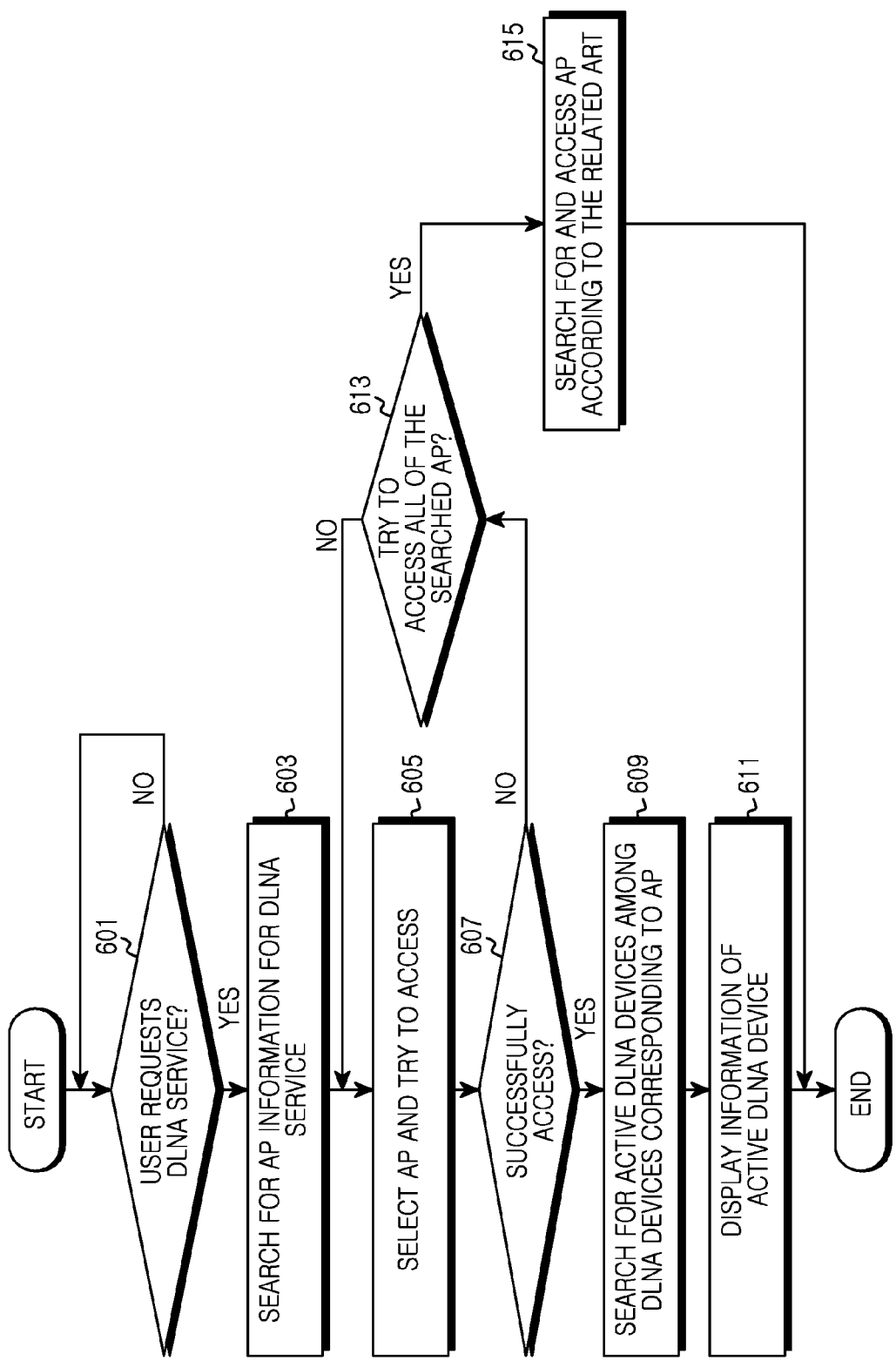
FIG. 6 is a flowchart illustrating a mobile terminal method for executing a DLNA service in the DLNA network according to an embodiment of the present invention.

FIG. 6 is a flowchart illustrating a method for executing a DLNA service in a DLNA network according to an embodiment of the present invention.

Referring to FIG. 6, when a user requests the DLNA service in step 601, the mobile terminal searches for the information of the AP capable of providing the DLNA service in step 603. That is, the mobile terminal searches for the APs mapped and stored with the DLNA device.

In step 605, the mobile terminal selects an AP from among the searched APs and attempts accessing the selected AP. For example, the mobile terminal may select the AP accessed most recently among the searched APs, and may select the AP under the user control.

In step 607, the mobile terminal determines whether the access to the selected AP is successful. When access to the selected AP is successful, the mobile terminal searches for the active DLNA devices among the DLNA devices corresponding to the AP in step 609. That is, the mobile terminal searches amongst the DLNA devices stored in the DB for DLNA devices that are mapped and stored with the AP and active. In step 611, the mobile terminal displays information of the active DLNA device in a screen. Herein, the information of the active DLNA device can be the content information of the DLNA device.

However, access to the selected AP is not successful in step 607, the mobile terminal determines whether access has been attempted to all of the searched APs in step 613. When access has not been attempted to all of the searched APs, the method returns to step 605, where access is attempted to another AP.

However, when the mobile terminal has already tried to access all of the searched APs in step 613, the mobile terminal searches for and accesses the AP in a conventional manner in step 615.

As described above, because the mobile terminal automatically detects and manages the DLNA device in the DLNA network, the intuitive and convenient DLNA service can be provided. By using the media-oriented service, the user can rapidly search for and share the contents of the other DLNA devices. By suspending the DLNA related operation during the DLNA network disconnection, a load of a Central Processing Unit (CPU) can be reduced and the power consumption of the device can be optimized.

When the mobile terminal is connected to the DLNA network, the DLNA device is detected and its content is received, stored, and managed. Thus, when the user requests the DLNA service, the relevant operation can be fulfilled using the pre-stored information within a short time and the network traffic can be reduced.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of a mobile terminal for sharing content in a home network environment, the method comprising:
   detecting a connection to a network;
   searching for at least one device connected to the network; and
   when the at least one device is connected to the network, checking a type of the at least one device connected to the network, determining whether to operate the mobile terminal as a content providing server according to the type of the at least one device, and storing information of the at least one device corresponding to an Access Point (AP) connected to the mobile terminal, when the mobile terminal operates as the content providing server.

2. The method of claim 1, wherein determining whether to operate the mobile terminal as the content providing server according to the type of the at least one device connected to the network comprises:
   determining to operate the mobile terminal as the content providing server, when the at least one device connected to the network does not include the content providing server.

3. The method of claim 1, wherein determining whether to operate the mobile terminal as the content providing server according to the type of the at least one device connected to the network comprises:
   determining to operate the mobile terminal as either a player for playing content or a controller for controlling playing the content, when the at least one device connected to the network includes the content providing server.

4. The method of claim 3, further comprising:
   mapping and storing the information of the at least one device with the AP;
   receiving content information from the content providing server among the at least one device connected to the network; and
   receiving a thumbnail of the content.

5. The method of claim 1, further comprising
   setting state information of the stored at least one device to an active state.

6. The method of claim 1, further comprising verifying pre-stored data, when no devices are connected to the network.

7. The method of claim 6, wherein the pre-stored data is verified using at least one of a data size, an access count, an access frequency, and a Time To Live (TTL) from a last access time to a current time.

8. The method of claim 1, further comprising:
   detecting network disconnection of the at least one device connected to the network; and
   setting active state information of the disconnected device to an inactive state.

9. The method of claim 1, further comprising:
   receiving a request to execute a home network service from a user;
   searching for at least one AP capable of providing the home network service; and
   attempting access to any one of APs identified during searching,
   wherein the at least one AP capable of providing the home network service is mapped and stored with the information of the at least one device connected to the network.

10. The method of claim 1, further comprising aborting a home network service related operation, when detecting a network disconnection according to a network connection detection result.

11. An apparatus of a mobile terminal for sharing content in a home network environment, the apparatus comprising:
   a storage unit; and
   a control unit for detecting a connection to a network, searching for at least one device connected to the network, and when the at least one device is connected to the network, checking a type of the at least one device connected to the network, determining whether to operate the mobile terminal as a content providing server according to the type of the at least one device, and storing information of the at least one device corresponding to an Access Point (AP) connected to the mobile terminal, when the mobile terminal operates as the content providing server, in the storage unit.

12. The apparatus of claim 11, wherein the control unit determines to operate the mobile terminal as the content providing server, when the at least one device connected to the network does not include the content providing server.

13. The apparatus of claim 11, wherein the control unit determines to operate the mobile terminal as either a player for playing content or a controller for controlling playing the content, when the at least one device connected to the network includes the content providing server.

14. The apparatus of claim 13, further comprising:
   a communication unit for receiving content information from the content providing server among the at least one device connected to the network under control of the control unit, and receiving a thumbnail of the content.

15. The apparatus of claim 11,
   wherein the control unit sets state information of the at least one stored device to an active state.

16. The apparatus of claim 11, wherein the control unit verifies pre-stored data, when no device is connected to the network.

17. The apparatus of claim 16, wherein the control unit verifies the pre-stored data using at least one of a data size, an access count, an access frequency, and a Time To Live (TTL) from a last access time to a current time.

18. The apparatus of claim 11, wherein the control unit detects a network disconnection of the at least one device connected to the network, and sets active state information of the disconnected device to an inactive state.

19. The apparatus of claim 11, wherein the control unit receives a request to execute a home network service from a user, searches for at least one AP capable of providing the home network service, and attempts to access any of the searched APs, and
   wherein the AP capable of providing the home network service is mapped and stored with the information of the at least one device connected to the network.

20. The apparatus of claim 11, wherein the control unit aborts a home network service related operation, when detecting a network disconnection according to a network connection detection result.

* * * * *